(12) United States Patent
Goebel et al.

(10) Patent No.: US 6,196,926 B1
(45) Date of Patent: **\*Mar. 6, 2001**

(54) ELASTOMER COUPLING HAVING CYLINDRICAL SURFACE HUBS

(75) Inventors: Alan Goebel, Milwaukee; James Braun, Waukesha, both of WI (US)

(73) Assignee: Rexnord Corporation, Milwaukee, WI (US)

(\*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,147

(22) Filed: Oct. 29, 1998

(51) Int. Cl.[7] ....................................... F16D 3/52
(52) U.S. Cl. ................................. 464/80; 464/88
(58) Field of Search ................... 464/51, 80, 87, 464/88, 89, 93

(56) References Cited

U.S. PATENT DOCUMENTS

| 1,107,315 | 8/1914 | Krebbs ................................ 464/903 |
| 1,501,187 | 7/1924 | Rayfield .............................. 464/903 |
| 2,971,356 | 2/1961 | Reuter et al. ........................ 464/903 |
| 3,178,906 | 4/1965 | Ricketts .............................. 464/903 |
| 3,524,332 | 8/1970 | Callies ................................ 464/80 |
| 3,621,674 | * 11/1971 | Ulics et al. ........................ 464/88 X |
| 3,623,339 | * 11/1971 | Muller ............................... 464/88 X |
| 3,702,545 | 11/1972 | Schlotmann et al. ............... 464/80 |
| 4,634,400 | 1/1987 | Butzow et al. ...................... 464/88 |
| 5,318,480 | 6/1994 | Essi et al. ........................... 464/175 |
| 5,564,982 | * 10/1996 | Gipson et al. ...................... 464/88 |
| 5,611,732 | 3/1997 | Tirumalai ........................... 464/80 |
| 5,910,049 | * 6/1999 | DeWachter et al. ................. 464/80 |
| 6,080,065 | 6/2000 | Hindman et al. .................... 464/32 |

FOREIGN PATENT DOCUMENTS

| 2653505 | 4/1991 | (FR) ...................................... 464/80 |
| 159761 | 3/1979 | (NL) ...................................... 464/80 |

OTHER PUBLICATIONS

Dodge Para–Flex FBX Couplings, Reliance Electric Co., 464/80, pp. 1–6, 1995.\*

\* cited by examiner

*Primary Examiner*—Lynne H. Browne
*Assistant Examiner*—Greg Binda
(74) *Attorney, Agent, or Firm*—Quarles & Brady LLP

(57) ABSTRACT

Disclosed herein is an elastomeric coupling for transmitting torque between two shafts approximately aligned on a shaft axis, which coupling comprises a composite member extending arcuately about an axis and including an elastomeric center element having an axially and radially extending portion including an inner surface, a shoe having an axially inner portion fixed to the extending portion of the elastomeric center element, and an axially outer portion extending from the axially inner portion and including an inner surface, and a hub adapted to be connected to one of the shafts and including an outer surface having a circumference and a length and being engaged with the inner surface of the shoe substantially throughout the circumference and the length of the outer surface of the hub.

17 Claims, 2 Drawing Sheets

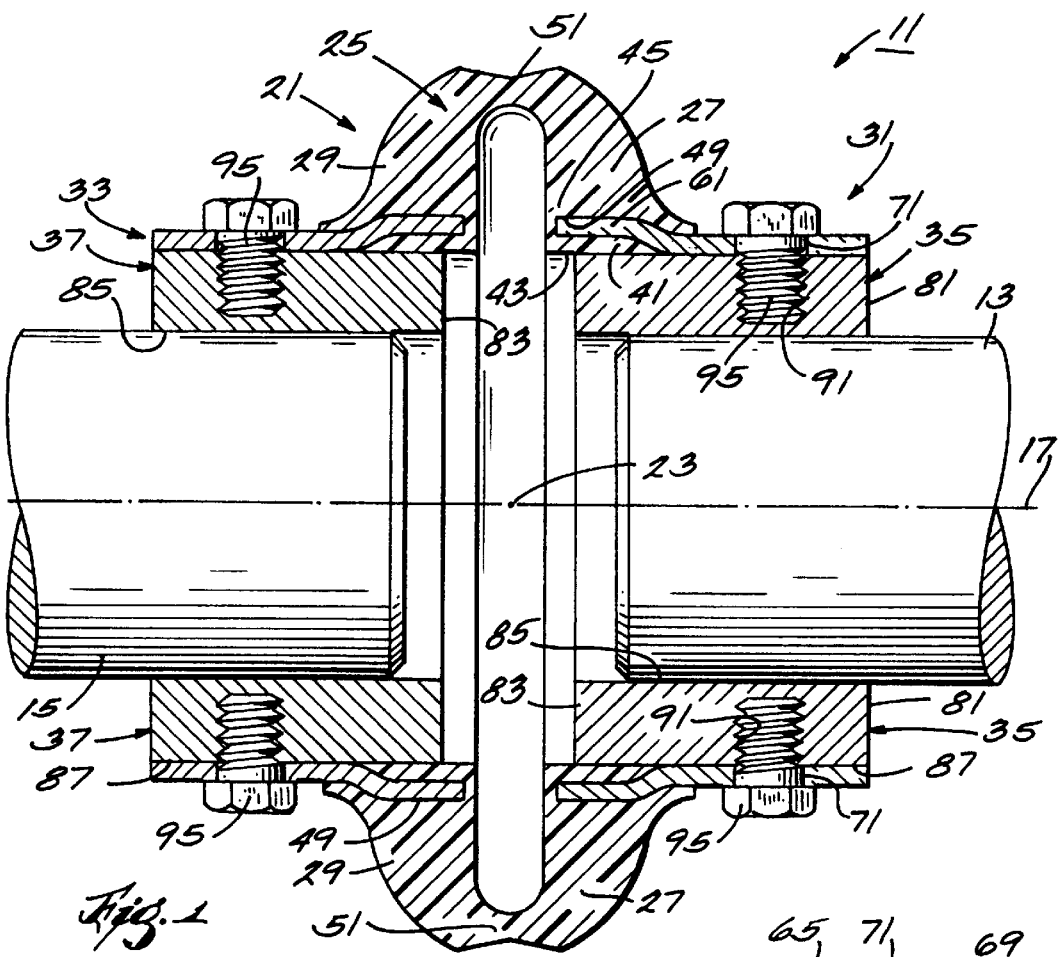
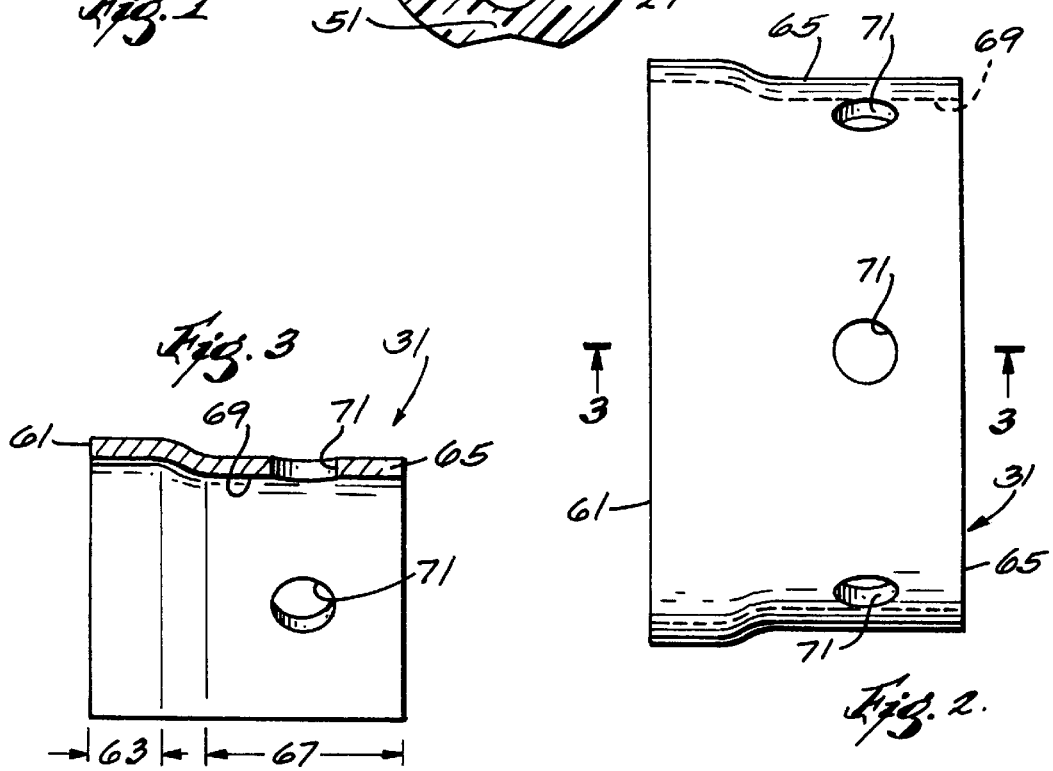

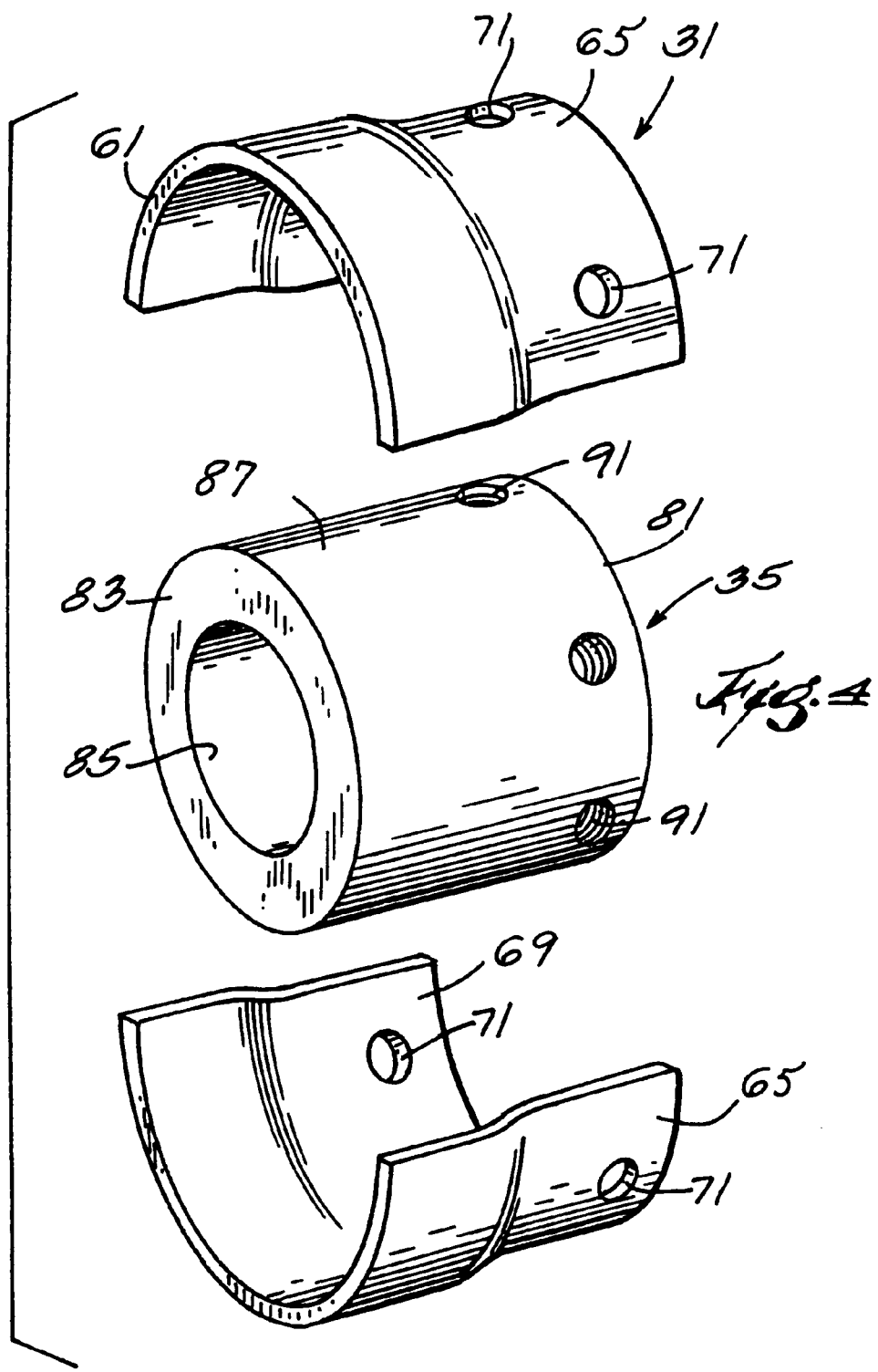

ELASTOMER COUPLING HAVING CYLINDRICAL SURFACE HUBS

BACKGROUND OF THE INVENTION

The invention relates to flexible shaft couplings, and more particularly, to elastomeric couplings for transmitting torque between two shafts approximately aligned on a shaft axis, i.e., to elastomeric couplings joining a pair of axially spaced shafts.

In the past such elastomeric couplings have comprised a composite member extending arcuately about an axis generally coinciding with the shaft axis and including an elastomeric center element having integrally connected first and second axially spaced portions which extend radially and in opposite axial directions, together with first and second shoes which are respectively fixed to the center element and which extend in axially opposite directions, and first and second hubs which are respectively fixed within the shoes.

In the past, the first and second portions of the center element included semi-cylindrical inner surfaces to which the outer surfaces of the axially extending inner parts of the first and second shoes were fixed or bonded. In addition, in the past, the outer surfaces of the hubs respectively included radially outwardly extending collars or shoulders which were raised above the remainder of the outer surfaces and which respectively engaged the inner surfaces of the outer parts of the first and second shoes. Such projections are shown in U.S. application Ser. No. 09/120,948, which was filed Jul. 22, 1998, which is entitled Tearing Configuration for Flexible Element of Elastomeric Coupling, and which is incorporated herein by reference. Such projections had a circular cross-section in a plane extending perpendicularly to a radial line, and had a width of about one-quarter of the axial hub length and were located closer to the outer hub ends than to the inner hub ends. Such projections also received the bolts connecting the hubs to the shoes. As a consequence, only a small portion of the hubs engaged the inner surfaces of the shoes.

Thus, these previous constructions required a stepped hub or non-uniform cylindrical hub and the urethane extended below the surface of the non-formed or streight metal shoe.

Attention is directed to U.S. Pat. No. 4,634,400, which issued Jan. 6, 1987 and which is also incorporated herein by reference.

SUMMARY OF THE INVENTION

The invention provides an elastomeric coupling for transmitting torque between two shafts approximately aligned on a shaft axis, which coupling comprises a pair of semi-circular composite members each including an elastomeric center element and a shoe having an axially inner portion fixed to the extending portion of the elastomeric center element, and an axially outer portion extending from the axially inner portion and including an inner surface. A hub is adapted to surround one of the shaft ends, and the hub includes an outer cylindrical surface having a circumference and a length. The cylindrical outer surface of the hub provides a support surface for the complementary inner surface of the axially outer portion of the shoe.

In one preferred form of the invention, the axially inner portion of the shoe is encapsulated in and fixed in the material of the elastomeric element and the axially outer portion is offset radially inwardly with respect to the axially inner portion.

Other features and advantages of the invention will become apparent to those skilled in the art upon review of the following detailed description, claims and drawings.

DESCRIPTION OF THE DRAWINGS

FIG. 1 is a diametral sectional view of an elastomeric coupling which embodies various of the features of the invention.

FIG. 2 is an elevational view of one of the components included in the elastomeric coupling shown in FIG. 1.

FIG. 3 is a partial sectional view taken along line 3—3 in FIG. 2.

FIG. 4 shows a hub and shoes.

FIG. 4 is a perspective exploded view of a hub and shoe of the coupling shown in FIG. 1. Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in the drawings is an elastomeric coupling 11 for transmitting torque between two shafts 13 and 15 approximately aligned on a shaft axis 17, which coupling 11 is generally annular and comprises a pair of semi-circular composite members 21 surrounding an axis 23 generally coinciding with the shaft axis 17. Each composite member 21 includes an elastomeric center element 25 having integrally connected first and second axially spaced portions 27 and 29 which extend radially and in opposite axial directions, together with first and second shoes 31 and 33 which are respectively fixed to the first and second axially spaced portions 27 and 29 of the center element 25 and which extend in axially opposite directions. The coupling also includes first and second hubs or barrels 35 and 37 which are respectively fixed within the first and second shoes 31 and 33, and which surround and are fixed on the shafts 13 and 15 so as to afford driving of one of the shafts 13 and 15 by the other of the shafts 13 and 15.

More particularly, the center element 25 is generally semi-annular and can be fabricated of any suitable elastomeric material, such as urethane. The axially spaced portions 27 and 29 are generally identically constructed and each comprises a radially inner part 41 having an inner cylindrical surface 43, and a radially outer part 45 integrally connected to the inner part 41. The first and second portions 27 and 29 of the center element 25 are integrally connected by a bridge portion 51 which is located in axially spaced relation to the axis 23 and which extends from the radially outer margins of the radially outer parts 45 of the first and second axially spaced portions 27 and 29 of the center element 25.

The first and second shoes 31 and 33 are generally identically constructed, are generally semi-annular, and can be fabricated of any suitable generally rigid material, such as a metal. The first and second shoes 31 and 33 respectively have axially inner portions 61 with a first axial length 63. The axially inner portions 61 of the first and second shoes 31 and 33 respectively are molded into the axially spaced first and seconds portions 27 and 29 of the center element 25 and are bonded at surface 49 to the outer parts 45 and preferably both of the radially inner and outer parts 41 and 45 of the first and seconds portions 27 and 29 of the center element 25. Thus, the axially inner ends of the first and second shoes 31 and 33 are sandwiched between, or integrally housed in, the radially inner and outer parts 41 and 45 of the first and seconds portions 27 and 29 of the center element 25.

The first and second shoes 31 and 33 also respectively include axially outer portions 65 respectively extending from the axially inner portions 61 and having second axial lengths 67 greater than the axial lengths 63 of the inner portions 61. In addition, the axially outer portions 65 extend in radially inwardly offset relation from the associated axially inner portions 61 and include respective cylindrical inner surfaces 69 coinciding with the cylindrical inner surfaces 43 of the first and second portions 27 and 29 of the center element 25. Still further in addition, the axially outer portions 65 respectively include a plurality of arcuately spaced radially extending holes 71 which are located in spaced relation from the axially outer end of the associated one of the outer portions 65. While other constructions can be employed, in the disclosed construction, there are three such equi-angularly spaced holes 71.

The first and second hubs or barrels 35 and 37 are generally identically constructed, are generally annular, and can be fabricated of any suitable generally rigid material, such as a metal. The first and second hubs or barrels 35 and 37 respectively include first axially located outer ends 81, second axially located inner ends 83 located in axially spaced relation to the first or outer ends 81, and inner axial bores or surfaces 85 adapted to be respectively connected to, or engaged with, the first and second shafts 13 and 15. In addition, the first and second hubs 35 and 37 respectively include outer cylindrical surfaces 87 which are respectively engaged by the inner surfaces 69 of the first and second shoes 31 and 33. In the disclosed construction, the outer cylindrical surfaces 87 of the hubs 35 and 37 respectively have a circumference and a length, and the outer cylindrical surfaces 87 of the hubs 35 and 37 and the inner surfaces 69 of the shoes 31 and 33 are engaged substantially throughout the surfaces 87 of the hubs 35 and 37.

In addition, the first and second hubs or barrels 35 and 37 also respectively include a plurality of arcuately spaced and radially extending apertures 91 which correspond in number to the holes 71 of the shoes 31 and 33, which are located in axially spaced relation to the outer and inner axially spaced ends 81 and 83, and in closer relation to the outer ends 81 than to the inner ends 83, and in respective registering relation to the holes 71 of the axially outer portions 65 of the first and second shoes 31 and 33.

Means are provided for fixing the shoes 31 and 33 to the hubs 35 and 37 for common rotary movement. While other constructions can be employed, in the disclosed construction, such means comprises the holes 71, the apertures 91, and, for each of the registered holes 71 and apertures 91, a suitable bolt or screw 95 which passes through the associated hole 71 and is threaded into the associated aperture 91.

Any suitable means (not shown) can be provided for respectively connecting the hubs or barrels 37 and 39 to the shafts 13 and 15 for common rotary movement.

As a consequence of the engagement of generally the entire outer cylindrical surfaces 87 of the hubs 35 and 37 with the shoes 31 and 33, and the elimination of a collar surrounding the hub, as compared to the previous limited engagement of the collar or hub projections with the inner shoe surfaces, the hubs 35 and 37 can include axial bores 85 of greater diameter, thereby permitting use on larger shafts. In addition the disclosed hubs 35 and 37 are easier to align, are cheaper to manufacture, and provide larger surface areas in contact with the associated shoes 31 and 33 to reduce bending stresses on the associated shoes 31 and 33.

Furthermore, the disclosed hubs or barrels 35 and 37 can be used with both closely spaced and more widely spaced coupling arrangements.

Because the inner portions 61 of the shoes 31 and 33 are molded into the elastomeric material, and because of the offset between the inner and outer portions 61 and 65 of the shoes 31 and 33, the elastomeric material of the center element 25 encapsulates the inner portions 61 of the shoes 31 and 33 without adversely affecting attachment and function of the hubs or barrels 35 and 37. In addition, the presence of the elastomeric material at the inner cylindrical surfaces 43 of the axially spaced portions 27 and 29 of the center element 25 has an improved appearance.

Use the cylindrical hubs 35 and 377 in conjunction with the formed shoes 31 and 33 advantageously provides additional contact area between the cylindrical hubs 33 and 35 and the metal shoes 31 and 33. The insude diameter of the shoes is flush with the outside diameter of the hubs. This additional contact area reduces bending stresses by providing greater support, as compared to the prior use of a non-cylindrical hub and straight shoe design. In the past, the shoe would tend to pivot on the narrow contact area of the non uniformed cylindrical hub.

Use of the cylindrical hub 35 and 37 with uniform outer cylindrical surfaces also advantageously provides additional material that allows for larger bore capacities compared with the prior non-uniform cylindrical type hub. In many cases, this advantage will provide the opportunity for a smaller coupling selection.

The cylindrical hubs 35 and 37 also advantageously provides a uniform surface for easy alignment and reduces the machining required in manufacturing.

The disclosed construction of the shoes 31 and 33 also advantageously acts as a rib or flange which increases the stiffness of the shoe. This increased strength is more resistant to bending under stresses when the coupling is in operation.

Various of the features are set forth in the following claims.

What is claimed is:

1. An elastomeric coupling for transmitting torque between two shafts approximately aligned on a shaft axis, said coupling comprising:

an elastomeric center element having an axially and radially extending portion including an inner surface;

a shoe having an axially inner portion buried in and fixed to said extending portion of said elastomeric center element, and an outer portion offset radially inward from said inner portion and extending axially from said axially inner portion, wherein a radially inner surface of said shoe includes an inner portion radially inner surface and an outer portion radially inner surface; and a hub adapted to be connected to one of the shafts and including a radially outer surface having a circumference and a length, and being engaged with said radially inner surface of said shoe outer portion substantially throughout said length of said outer surface of said hub, and being engaged with said shoe outer portion inner surface substantially throughout said circumference.

2. An elastomeric coupling in accordance with claim 1 wherein said outer surface of said hub is cylindrical, and wherein said inner surface of said shoe is cylindrical.

3. An elastomeric coupling in accordance with claim 1 wherein said axially inner portion of said shoe has a first axial length, and wherein said outer portion of said shoe has a second axial length greater than said first axial length.

4. An elastomeric coupling in accordance with claim 1 wherein said radially extending portion of said center element includes a radially inner portion, and a radially outer portion integrally connected to said center element inner portion, and wherein said axially inner portion of said shoe is radially outwardly offset from said axially outer portion and is sandwiched between said radially inner and outer portions of said center element.

5. An elastomeric coupling in accordance with claim 4 wherein said radially inner portion of said center element includes an inner surface coinciding with said inner surface of said outer portion of said shoe.

6. An elastomeric coupling in accordance with claim 1 wherein said axially outer portion of said shoe includes a plurality of arcuately spaced radially extending holes, and wherein said hub includes a plurality of arcuately spaced radially extending apertures registerable with said holes of said axially outer portion of said shoe.

7. An elastomeric coupling in accordance with claim 6 wherein said hub also includes a first axially located end, and a second axially located end in axially spaced relation to said first end, and wherein said plurality of arcuately spaced radially extending apertures are located in spaced relation to said first and second axially spaced ends and in closer relation to one of said first and second ends than to the other of said first and second ends.

8. An elastomeric coupling for transmitting torque between two shafts approximately aligned on a shaft axis, said coupling comprising:

an elastomeric center element having an axially and radially extending portion including an inner surface;

a shoe having an axially inner portion fixed to said extending portion of said elastomeric center element, and an outer portion extending axially from said axially inner portion and including an inner cylindrical surface having a length; and a hub adapted to be connected to one of the shafts and including an outer cylindrical surface engaged with substantially the entire length of said outer portion inner cylindrical surface of said shoe, and said center element inner surface.

9. An elastomeric coupling in accordance with claim 8 wherein said radially extending portion of said center element includes a radially inner portion, and a radially outer portion integrally connected to said center element inner portion, and wherein said axially inner portion of said shoe is radially outwardly offset from said axially outer portion and is sandwiched between said radially inner and outer portions of said center element.

10. An elastomeric coupling for transmitting torque between two shafts approximately aligned on a shaft axis, said coupling comprising:

an elastomeric element having an axially and radially extending portion;

a shoe having an axially inner portion buried in and fixed to said axially extending portion of said elastomeric element, and an outer portion extending axially from said axially inner portion in radially inwardly offset relation from said axially inner portion, wherein a radially inner surface of said shoe includes an inner portion radially inner surface and an outer portion radially inner surface; and a hub adapted to be connected to one of the shafts and including a radially outer surface engaged with said radially inner surface of said shoe outer portion.

11. An elastomeric coupling in accordance with claim 10 wherein said inner portion of said shoe has a first axial length, and wherein said outer portion of said shoe has a second axial length greater than said first axial length.

12. An elastomeric coupling in accordance with claim 10 wherein said axially and radially extending portion of said center element includes a radially inner portion, and a radially outer portion integrally connected to said center element inner portion, and wherein said axially inner portion of said shoe is sandwiched between said radially inner and out portions of said center element.

13. An elastomeric coupling in accordance with claim 12 wherein said inner surface of said outer portion of said shoe is cylindrical, and wherein said radially inner portion of said center element includes an inner cylindrical surface coinciding with said cylindrical inner surface of said outer portion of said shoe.

14. An elastomeric coupling in accordance with claim 10 wherein said axially outer portion of said shoe includes a plurality of arcuately spaced radially extending holes, and wherein said hub includes a plurality of arcuately spaced radially extending apertures registerable with said holes of said axially outer portion of said shoe.

15. An elastomeric coupling in accordance with claim 14 wherein said hub also includes a first axially located end, and a second axially located end in axially spaced relation to said first end, and wherein said plurality of arcuately spaced radially extending apertures are located in spaced relation to said first and second axially spaced ends and in closer relation to one of said first and second ends than to the other of said first and second ends.

16. An elastomeric coupling in accordance with claim 10 wherein said outer surface of said hub is cylindrical and has a circumference and a length, wherein said outer portion inner surface of said shoe is cylindrical, and wherein said outer cylindrical surface of said hub and said outer portion inner cylindrical surface of said shoe are engaged substantially throughout said circumference of said outer surface of said hub.

17. An elastomeric coupling for transmitting torque between two shafts approximately aligned on a shaft axis, said coupling comprising:

an elastomeric center element having a first radially extending portion including a radially inner part having an inner cylindrical surface, and a radially outer part integrally connected to said inner part, and a second radially extending portion located in axially spaced relation from said first radially extending portion and including a radially inner part having an inner cylindrical surface, and a radially outer part integrally connected to said inner part of said second portion;

a first shoe having an axially inner portion with a first axial length, being sandwiched between, buried in, and fixed to said radially inner and outer parts of said first portion of said center element, and an axially outer portion extending from said axially inner portion, having a second axial length greater than said first axial length, being radially inwardly offset from said axially inner portion, and including a cylindrical inner surface coinciding with said cylindrical inner surface of said first portion of said center element, and a plurality of arcuately spaced radially extending holes;

a second shoe having an axially inner portion with a first axial length, being sandwiched between, buried in, and fixed to said radially inner and outer parts of said second radially extending portion of said center element, and an axially outer portion extending from said axially inner portion of said second shoe, having a second axial length greater than said first axial length of said inner portion of said second shoe, being radially inwardly offset from said axially inner portion of said second shoe, and including a cylindrical inner surface coinciding with said cylindrical inner surface of said second portion of said center element, and a plurality of arcuately spaced radially extending holes;

a first hub adapted to be connected to the first shaft and having a circumference, a length, a first axially located end, a second axially located end in axially spaced relation to said first end, an outer cylindrical surface engaged with said inner cylindrical surface of said first shoe substantially throughout said circumference of said outer surface of said first hub, and a plurality of arcuately spaced radially extending apertures located in spaced relation to said first and second axially spaced ends of said first hub and in closer relation to one of said first and second ends of said first hub than to the other of said first and second ends of said first hub and registering with said holes of said axially outer portion of said first shoe; and a second hub adapted to be connected to the second shaft and having a circumference, a length, a first axially located end, a second axially located end in axially spaced relation to said first end of said second hub, an outer cylindrical surface engaged with said inner cylindrical surface of said second shoe substantially throughout said circumference of said outer surface of said second hub, and a plurality of arcuately spaced radially extending apertures located in spaced relation to said first and second axially spaced ends of said second hub and in closer relation to one of said first and second ends of said second hub than to the other of said first and second ends of said second hub and registering with said holes of said axially outer portion of said second shoe.

* * * * *